United States Patent
Kruglick (10) Patent No.: US 9,432,720 B2
(45) Date of Patent: Aug. 30, 2016

(54) LOCALIZED AUDIO SOURCE EXTRACTION FROM VIDEO RECORDINGS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 81 days.

(21) Appl. No.: 14/380,698

(22) PCT Filed: Dec. 9, 2013

(86) PCT No.: PCT/US2013/073939
§ 371 (c)(1),
(2) Date: Aug. 22, 2014

(87) PCT Pub. No.: WO2015/088484
PCT Pub. Date: Jun. 18, 2015

(65) Prior Publication Data
US 2015/0350716 A1    Dec. 3, 2015

(51) Int. Cl.
| | |
|---|---|
| H04N 21/43 | (2011.01) |
| G11B 27/10 | (2006.01) |
| G11B 27/036 | (2006.01) |
| H04N 21/439 | (2011.01) |
| H04N 21/44 | (2011.01) |
| H04N 21/81 | (2011.01) |

(52) U.S. Cl.
CPC .......... *H04N 21/4307* (2013.01); *G11B 27/036* (2013.01); *G11B 27/10* (2013.01); *H04N 21/4394* (2013.01); *H04N 21/44008* (2013.01); *H04N 21/816* (2013.01)

(58) Field of Classification Search
USPC .................................................. 386/239–248
See application file for complete search history.

(56) References Cited

U.S. PATENT DOCUMENTS

| | | | |
|---|---|---|---|
| 2004/0156616 A1 | 8/2004 | Strub et al. | |
| 2004/0220862 A1* | 11/2004 | Jackson | G06F 3/002 705/26.1 |
| 2005/0057687 A1 | 3/2005 | Irani et al. | |

(Continued)

OTHER PUBLICATIONS

Irschara et al., From Structure-from-Motion Point Clouds to Fast Location Recognition, 2009.*

(Continued)

*Primary Examiner* — Hung Dang
(74) *Attorney, Agent, or Firm* — Turk IP Law, LLC (57) ABSTRACT

Technologies are generally described for a system to process a collection of video recordings of a scene to extract and localize audio sources for the audio data. According to some examples, video recordings captured by mobile devices from different perspectives may be uploaded to a central database. Video segments capturing an overlapping portion of the scene at an overlapping time may be identified, and a relative location of each of the video capturing devices may be determined. Audio data for the video segments may be indexed with a sub-frame time reference and relative locations as a function of overlapping time. Using the indices that include the sub-frame time references and relative locations, audio sources for the audio data may be extracted and localized. The extracted audio sources may be transcribed and indexed to enable searching, and may be added back to each video recording as a separate audio channel.

17 Claims, 6 Drawing Sheets

(56) References Cited

U.S. PATENT DOCUMENTS

| | | | |
|---|---|---|---|
| 2006/0239471 A1 | 10/2006 | Mao et al. | |
| 2007/0174326 A1* | 7/2007 | Schwartz | G06F 17/30038 |
| 2008/0145032 A1* | 6/2008 | Lindroos | H04N 7/163 |
| | | | 386/338 |
| 2010/0185617 A1* | 7/2010 | Burazerovic | H04N 7/165 |
| | | | 707/736 |
| 2011/0300929 A1 | 12/2011 | Tardif et al. | |
| 2012/0245936 A1 | 9/2012 | Treglia | |
| 2012/0263439 A1 | 10/2012 | Lassman et al. | |
| 2013/0041648 A1 | 2/2013 | Osman | |
| 2015/0123973 A1* | 5/2015 | Larsen | G06T 15/04 |
| | | | 345/427 |

OTHER PUBLICATIONS

"Hangouts," accessed at https://web.archive.org/web/20131208014223/http://www.google.com/+/learnmore/hangouts/, accessed on Aug. 13, 2014, pp. 1-5.

"How can I add videos to an event?," Facebook, accessed at http://www.facebook.com/help/131325477007622/, accessed on Aug. 13, 2014, pp. 1-2.

"Project Glass," accessed at https://plus.google.com/+projectglass/posts, Jul. 13, 2013, p. 1.

Bryan, N. J., et al., "Clustering and synchronizing multi-camera video Via landmark cross-correlation," IEEE International Conference on Acoustics, Speech and Signal Processing (ICASSP), pp. 2389-2392 (2012).

Fischler, M. A., and Bolles, R. C., "Random Sample Consensus: A Paradigm for Model Fitting with Applications to Image Analysis and Automated Cartography," Communications of the ACM, vol. 24, Issue 6, pp. 381-395 (1981).

International Search Report and Written Opinion for International Application No. PCT/US13 /73939 mailed on Apr. 28, 2014.

Isgro, F., et al., "Three-dimensional Image Processing in the Future of Immersive Media," IEEE Transactions on Circuits and Systems for Video Technology, vol. 14, Issue 3, pp. 288-303 (2004).

Li, Z., et al., "Flexible Layout and Optimal Cancellation of the Orthonormality Error for Spherical Microphone Arrays," IEEE International Conference on Acoustics, Speech, and Signal Processing, vol. 4, pp. 41-44 (2004).

Martin, J., "Sphericam—Breakthrough 360° Surround Video Camera," accessed on https://web.archive.org/web/20131207194029/http://www.kickstarter.com/projects/1996234044/sphericam-the-easy-360o-video-camera, Jan. 12, 2013, pp. 1-8.

Meyer, J., and Elko, G., "A highly scalable spherical microphone array based on an orthonormal decomposition of the soundfield," IEEE International Conference on Acoustics, Speech, and Signal Processing (ICASSP), vol. 2, pp. II-1781-II-1784 (2002).

O'Donovan, A., et al., "Microphone Arrays as Generalized Cameras for Integrated Audio Visual Processing," IEEE Conference on Computer Vision and Pattern Recognition, CVPR'07, pp. 1-8 (2007).

Patel, S. N., and Abowd, G. D., "The Contextcam: Automated Point of Capture Video Annotation," UbiComp 2004: Ubiquitous Computing, vol. 3205, pp. 301-318 (2004).

Quirk, P., et al., "RANSAC—Assisted Display Model Reconstruction for Projective Display," In Virtual Reality Conference, pp. 1-4 (2006).

Rizzo, P., et al., "Localization of sound sources by means of unidirectional microphones," Measurement Science and Technology, vol. 20, No. 5, pp. 1-12 (2009).

Templeman, R., et al., "PlaceRaider: Virtual Theft in Physical Spaces with Smartphones," arXiv Preprint, arXiv: 1209.5982, pp. 1-21, Sep. 2012.

Wedge, D., et al., "Using Space-Time Interest Points for Video Sequence Synchronization," IAPR Conference on Machine Vision Applications, pp. 190-194, May 16-18, 2007.

* cited by examiner

LOCALIZED AUDIO SOURCE EXTRACTION FROM VIDEO RECORDINGS

CROSS-REFERENCE TO RELATED APPLICATION

BACKGROUND

Unless otherwise indicated herein, the materials described in this section are not prior art to the claims in this application and are not admitted to be prior art by inclusion in this section.

Audio data may often be recorded by audio and video recording devices at events to record conversations, meetings, speakers, concerts, and other similar events. The audio data may be extracted from the audio/video recordings to localize audio sources from the recorded audio data to identity audio sources in the scene and to transcribe the audio data for future searching and indexing. Current techniques to record audio data may include placing microphones at known fixed locations in a scene and spatially resolving different sound sources using more than one microphone. Microphone arrays with two or more microphones may allow for differential sensing of sound and for listening to specific areas of a scene, if the relative position between the microphones is known precisely.

With the proliferation of handheld and mobile technology, users may frequently use handheld mobile devices, such as smart phones, to capture photographs and videos of events and scenes. Often the users may upload the captured videos to websites and social networks to share videos with other users. Such video recording archives may result in large amounts of video recordings of an event or scene from a wide variety of angles and perspectives. Each of the video recordings may capture audio data for the scene, although the video capturing devices may be handheld movable devices which may not be at fixed locations within the scene to enable audio extraction and localization employing an approach similar to a fixed microphone array approach.

SUMMARY

According to some examples, the present disclosure generally describes various methods to extract localized audio sources. The methods may include identifying at least two video recordings of a scene captured by at least two spatially separate video capturing devices, identifying at least two video segments within the recordings capturing an overlapping visual frame of the scene recorded at an overlapping time frame, determining a relative location of at least the two video capturing devices during the overlapping time frame, and localizing one or more audio sources for audio data recorded by the at least two video capture devices.

According to other examples, the disclosure also describes multiple servers to extract localized audio sources, where the servers may include a memory configured to store instructions and at least one processor configured to execute an audio localization application in conjunction with the instructions stored in the memory. The audio localization application may be configured to identify at least two video recordings of a scene by at least two spatially separate video capturing devices, identify at least two video segments within the recordings capturing an overlapping visual frame of the scene recorded at an overlapping time frame, determine a relative location of each of the at least two video capturing devices during the overlapping time frame, and localize one or more audio sources for audio data recorded by the at least two video capture devices.

According to further examples, the present disclosure generally describes a computer readable memory device with instructions stored thereon to extract localized audio sources, where the instructions may include identifying at least two video recordings of a scene by at least two spatially separate video capturing devices, identifying at least two video segments within the recordings capturing an overlapping visual frame of the scene recorded at an overlapping time frame, determining a relative location of each of the at least two video capturing devices during the overlapping time frame, and localizing one or more audio sources for audio data recorded by the at least two video capture devices.

According to yet other examples, the disclosure describes a mobile computing device configured to capture data for extraction of localized audio sources. The mobile computing device may be configured to capture a first video recording of a scene, collect a second video recording of the scene from a second mobile computing device, identify at least two video segments with the first and second video recordings that capture an overlapping visual frame of the scene recorded at an overlapping time frame, determine a location of the second mobile computing device relative to the first mobile computing device, and localize one or more audio sources for audio data recorded by the first and second mobile computing devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn to, inter alia, methods, apparatus, systems, devices, and/or computer program products related to extraction of localized audio sources from video recordings.

Briefly stated, technologies are generally described for a system to process a collection of video recordings to extract and localize audio sources for the audio data. According to some examples, video recordings captured by mobile devices from different perspectives may be uploaded to a central database. Video segments capturing an overlapping portion of a scene at an overlapping time may be identified, and a relative location of each of the video capturing devices may be determined. Audio data for the video segments may be indexed with a sub-frame time reference and relative locations as a function of overlapping time. Using the indices that include the sub-frame time references and relative locations, audio sources for the audio data may be extracted and localized. The extracted audio sources may be transcribed and indexed to enable searching, and may be added back to each video recording as separate audio channel(s).

Figure 1:
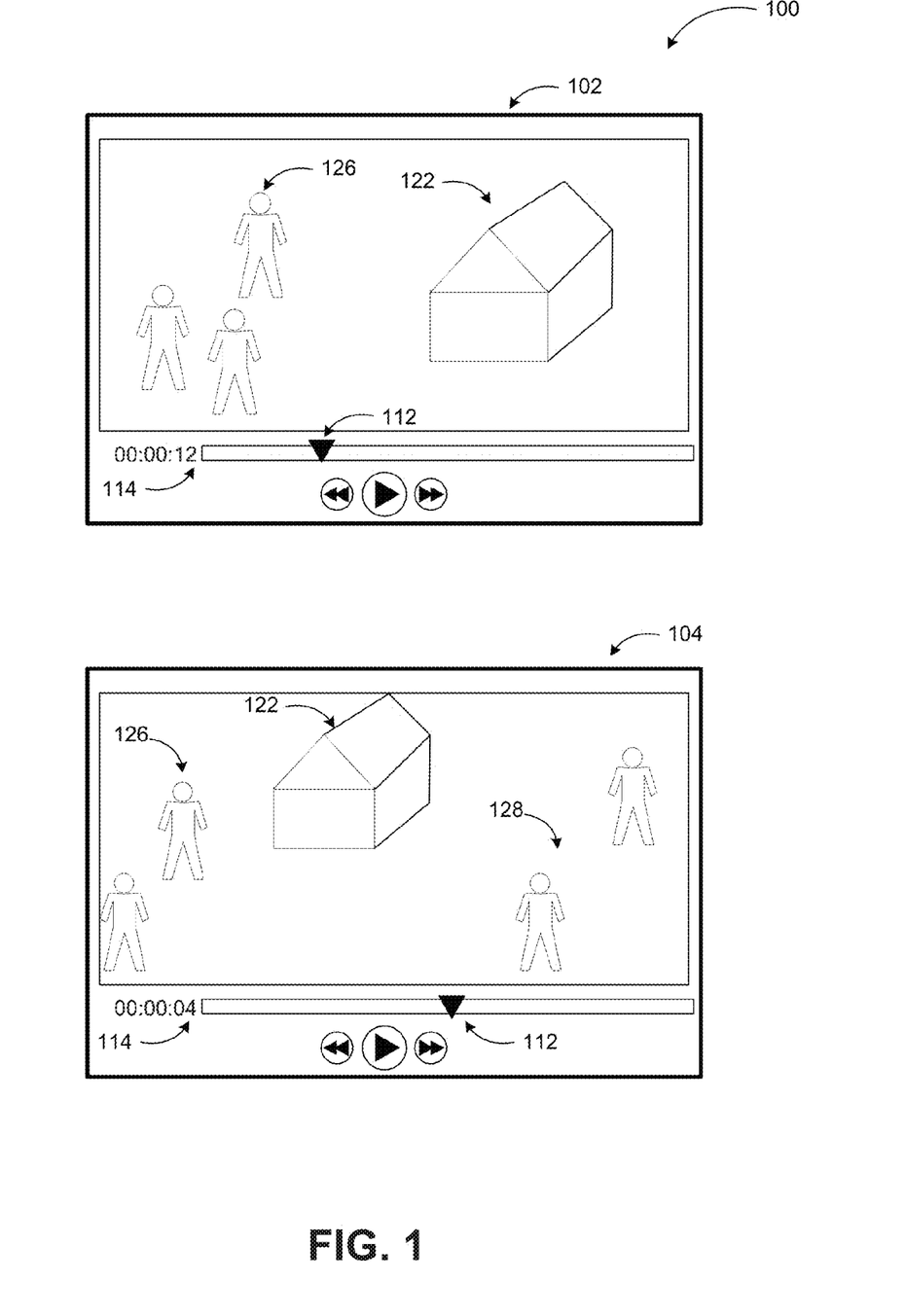
FIG. 1 illustrates unsynchronized video recordings of a scene from different perspectives.

FIG. 1 illustrates unsynchronized video recordings of a scene from different perspectives, arranged in accordance with at least some embodiments as described herein.

As illustrated in a diagram 100, two or more video recordings 102, 104 of a scene may be captured by two or more spatially separate video capturing devices. In an example embodiment, each of the video recordings 102, 104 may capture one or more common objects 122, 126 of the scene. The spatially separate video capturing devices may be located at different positions and angles relative to the scene of interest such that each video recording may capture a different perspective of the common objects 122, 126 of the scene. For example, the common objects 122, 126 may be viewed at a large size near the center of a visual flame of a first video recording 102, and the common objects 122, 126 may be viewed as a smaller size and near a left side of a visual frame of a second video recording 104. The second video recording 104 may also capture additional objects 128 that may not be visible in the first video recording 102 due to the spatially separate locations and different perspectives of the video capturing devices. The video recordings may be different sizes and lengths, as demonstrated by length 114 and position 112 indicators on each video recording. Furthermore, each video capturing device may not be at a fixed location, such as in a scenario where the video capturing device may be handheld and may move with a user holding the device.

In an example embodiment, each video recording may include audio data in addition to visual data for the scene. Audio data may include background noise, music, people talking, and other similar sounds produced by different objects in the scene, for example. It may be difficult to hear and distinguish a particular audio source, such as a speaker, from audio data of a video recording. It may be beneficial to distinguish particular audio sources from audio data for a video recording. For example, audio speech extraction applications may distinguish speakers in the scene to transcribe a speech or conversation recorded in the video recording. Users may also desire to distinguish a particular recorded conversation from background conversations, music, and other sounds recorded in the video recording.

In distinguishing audio sources for audio data, the audio sources in the scene may be extracted, separated, and localized. Localized audio sources may have many applications. For example, localized audio sources may be used to generate a three-dimensional (3D) recreation of a scene, and to provide separate audio streams in the 3D recreation of the scene. Localized audio sources may also enable audio data detected from different sources in the scene to be identified, transcribed, and indexed for searching and later listening. For example, a location of a person in the scene may be detected, or a speaker in a conversation or meeting may be identified based on the localized audio data. Additionally, the localized audio sources may be employed to augment an augmented reality presentation. Yet other applications of localized audio sources may include surveillance, gunshot detection, meeting recording and analysis, and identification of noise sources where computer vision and computer audition can be used together to solve problems of interest.

Figure 2:
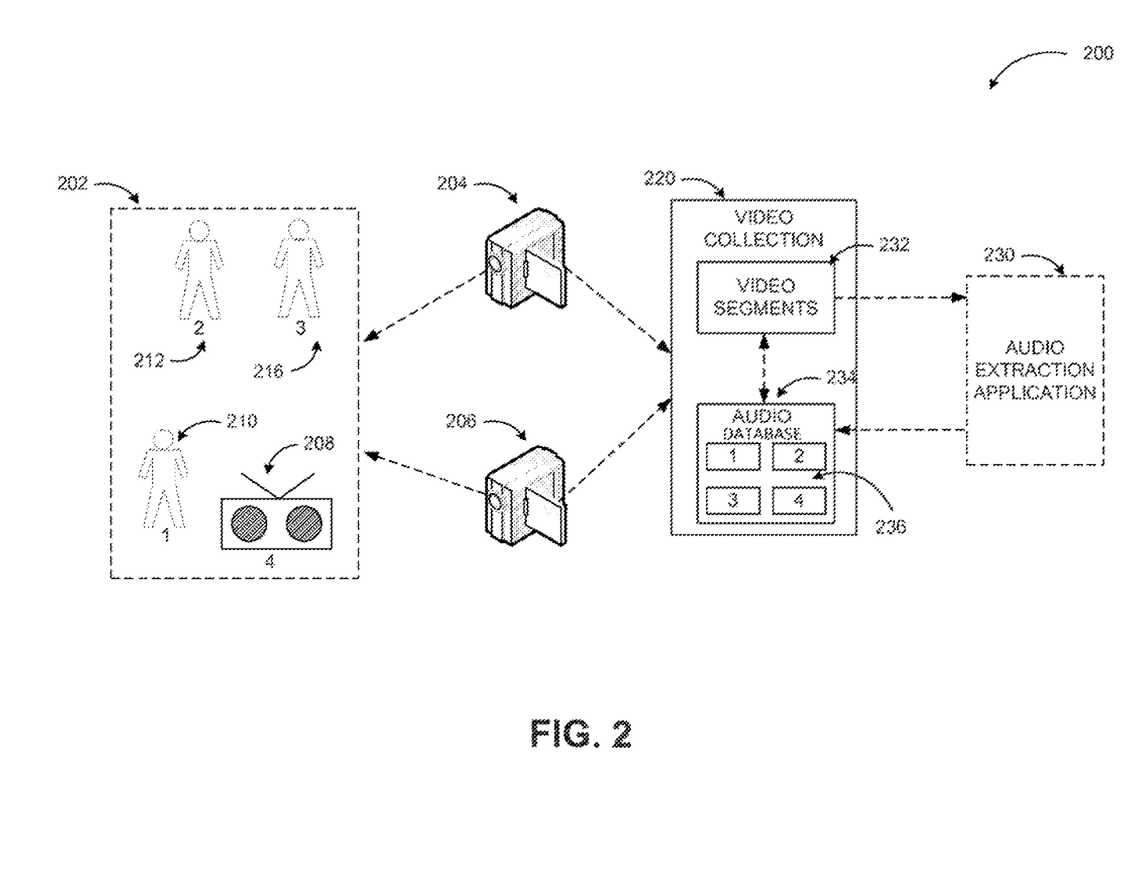
FIG. 2 conceptually illustrates an example video capture of a scene with at least two video capturing devices and extraction of audio data for audio sources in the scene.

FIG. 2 conceptually illustrates video capture of a scene with at least two video capturing devices and extraction of audio data for audio sources in the scene, arranged in accordance with at least some embodiments as described herein.

As demonstrated in a diagram 200, at least two video capturing devices 204, 206 may each capture recordings of a scene 202. The recordings of the scene 202 may include video data as well as audio data. Audio data may include background noise, voices, conversations, music, and other sounds made by objects (e.g., an audio source 208) and sounds made by people 210, 212, 216 within the scene 202. The video capturing devices 204, 206 may include a mobile device, a smart phone, a video camera, or other similar computing devices, for example, each configured to simultaneously record video and audio data.

In an example embodiment, video recordings captured by two or more video capturing devices may be stored in a video collection 220. The video collection 220 may be a database provided by a video gathering application and accessed over a network, such as a cloud based network. In some examples, a social network may provide a video gathering application to enable users to upload video recordings taken at an event. Other similar video gathering applications may facilitate collecting and storing video recordings of a scene or event, and the collected video recordings may be grouped in the video collection 220 according to an event, scene, or location. Each video recording in the video collection 220 may capture a different angle and perspective of the scene, event, and/or location.

In a system according to embodiments, the video recordings in the video collection 220 may be used to identify, extract, and localize one or more sources for audio data included in the video recordings. An audio extraction application 230 may facilitate the extraction and localization of the sources for the audio data. The audio extraction application 230 may be executed on a separate computing device accessed over a network, for example. The audio extraction application 230 may also be executed on a mobile device such as a tablet or smartphone and configured to receive and process video segments at the mobile device.

In an example embodiment, the audio extraction application 230 may identify at least two video segments 232 having an overlapping timing and overlapping visual frame from at least two video recordings in the video collection 220. The goal may be to identify video frames that capture a same portion of the scene 202 at a same time from a different perspective. The overlapping timing may be determined based on a timestamp and/or metadata associated with the video recordings. The overlapping visual frame may be determined employing audio correlation and visual inspection. Additionally, a three dimensional (3D) model of the scene may be assembled from the video collection, and video frames from each of the video recordings may be matched to roughly identify at least two video segments with overlapping time frames and visual frames such that the video segments that may capture overlapping audio data.

In an example embodiment, after the audio extraction application 230 identifies two video segments having an overlapping timing and overlapping visual frame, the audio extraction application 230 may extract the relative location of each video capturing device during the overlapping timing. The audio extraction application 230 may synchronize the two video segments to index the two video segments with a sub-frame time reference and location as a function of the overlapping timing. Using the indices that include the sub-frame time references and locations, the audio extraction application 230 may extract distinct audio sources for the audio data, and the extracted audio sources may be localized to a specific audio source.

In a system according to embodiments, the extracted localized audio sources may be separated into one or more separate audio streams 236 and stored individually in an audio database 234 associated with the video collection 220. The separate audio streams 236 for each audio source may be added back to the video recordings as one or more separate channels. The separated audio streams may also be transcribed and indexed. The transcribed audio streams may be stored with the video recordings as metadata, or in another embodiment the audio streams may be added back to the original video recording.

Figure 3:
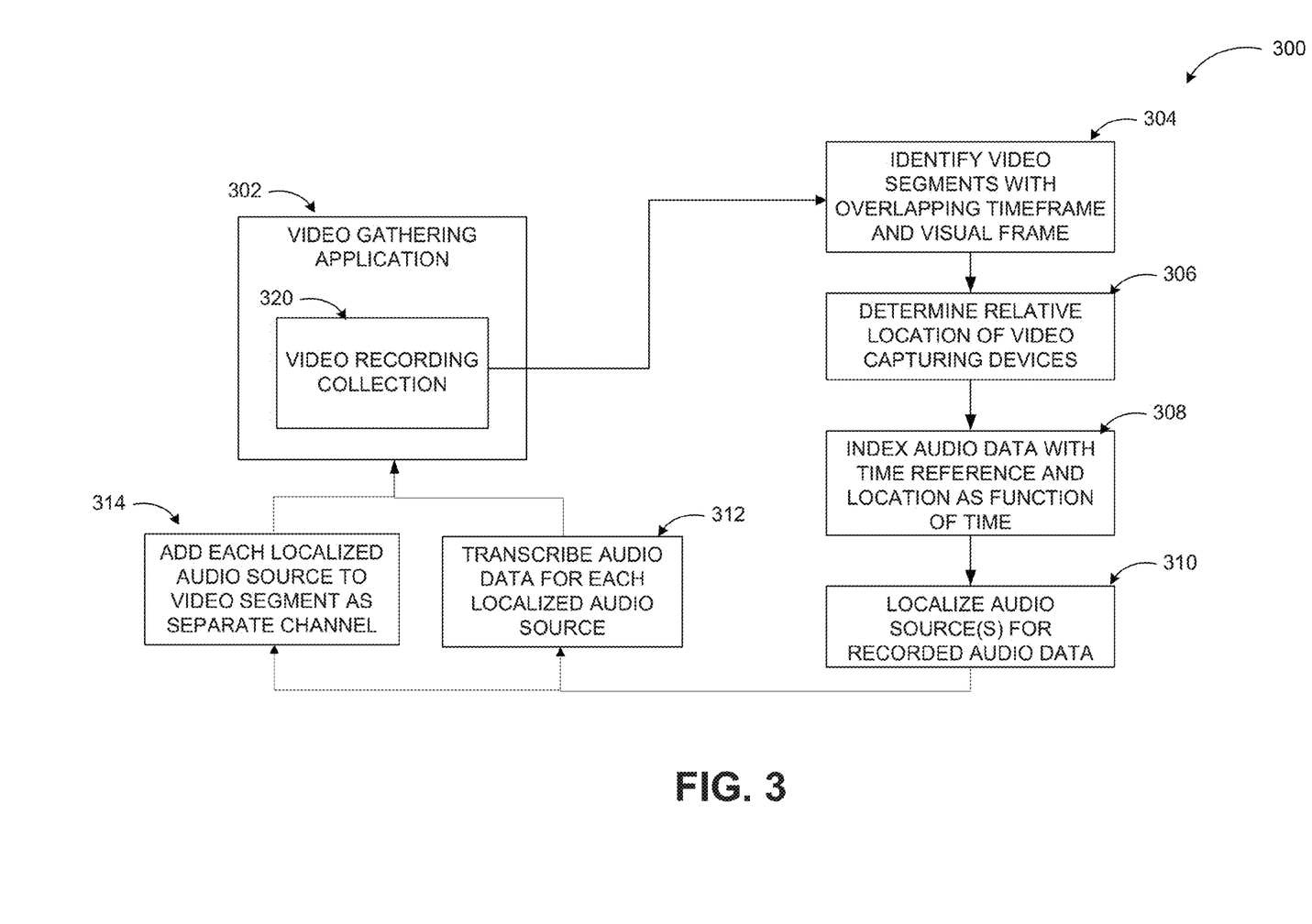
FIG. 3 illustrates an example schematic to extract localized audio sources from video recordings of a scene.

FIG. 3 illustrates an example schematic to extract localized audio sources from video recordings of a scene, arranged in accordance with at least some embodiments as described herein.

As illustrated in a diagram 300, a system for extraction of localized audio data may include a variety of modules configured to identify video recordings and extract localized audio data from the video recordings. As previously described, a video gathering application 302 may collect the video recordings of a scene captured by two spatially separate video capturing devices. Each video recording of the scene from the spatially separate video capturing devices may capture a different perspective of the scene, and the video recordings may be stored in a video recording collection 320 at the video gathering application 302. Some example video capturing devices may include mobile handheld video recording devices such as smart phones, video recording glasses, handheld video cameras, and other similar mobile video capturing devices.

In a system according to embodiments, a video identification module 304 may identify at least two video segments from the video recording collection 320 with overlapping timing and overlapping visual frames. The videos segments having overlapping timing and overlapping visual frames may capture a same portion of a scene at a same time frame from a different perspective while capturing a same portion of audio data. Video segments having overlapping timing may be identified based on timestamps and metadata associated with each video recording. General audio correlation to identify similar audio data from the video segments may facilitate identification of video segments having overlapping timing and visual frames. Another example technique to identify video segments having overlapping timing and overlapping visual frames may be to assemble a three dimensional (3D) model of a relevant location or scene from the entire video recording collection 320, and to match frames of each video segment to the 3D model. 3D model matching may roughly provide video segments with overlapping time frames and visual frames such that the video segments that may capture overlapping audio data.

Following is an example code using python language that may be employed to import and encode audio data to identify videos with overlapping time frames and visual frames. Embodiments may be implemented using any algorithm, programming language, and hardware devices. The example code below is for illustration purposes only.

```
#! /bin/env python import sys
import sys
import pymedia.muxer as muxer
import pymedia.video.vcodec as vcodec
def demuxVideo( inFile, outFile ):
        dm= muxer.Demuxer( inFile.split( '.' )[ -1 ].lower( ) )
        f= open( inFile, 'rb' )
        fw= open( outFile, 'wb' )
        s= f.read( 400000 )
        r= dm.parse( s )
        v= filter( lambda x: x[ 'type' ]==
    muxer.CODEC__TYPE__VIDEO, dm.streams )
        if len( v )== 0:
                raise 'There is no video stream in a file %s' %
                inFile
        v__id= v[ 0 ][ 'index' ]
        print 'Assume video stream at %d index: ' % v__id
        while len( s )> 0:
            for fr in r:
                if fr[ 0 ]== v__id:
                    fw.write( fr[ 1 ] )
            s= f.read( 400000 )
            r= dm.parse( s )
if name ==' main ':
    if len( sys.argv )!= 3:
        print "Usage: demux__video <in__file> <out__file>"
    else:
        demuxVideo( sys.argv[ 1 ], sys.argv[ 2 ] )
```

The audio data correlation may also be achieved using other algorithms and/or other programming languages using the principles described herein. Software and hardware combinations may be employed for audio data correlation, as well.

Furthermore, video segments having overlapping visual frames may be determined based on information identifying the location of the video recording such as a location and/or event name, or location data included in the metadata. The video identification module 304 may be separate from other modules of the system, and the video identification module 304 may be skipped when a group of video segments are provided that are known to have overlapping visual frames and timing.

In an example embodiment, a location determination module 306 may facilitate determining relative locations of each video capturing device associated with the selected video segments. After identification of the at least two videos segments having overlapping timing and overlapping visual frames, the location determination module 306 may determine the locations of the at least two video capturing devices associated with the video segments relative to each other. The relative locations may be determined employing a point-cloud video processing algorithm according to some examples. An example point-cloud video processing technique may be a random sample consensus (RANSAC) algorithm. In an example scenario of employing the RANSAC algorithm to determine the relative locations of the video capturing devices, a point-cloud may be generated for each of the at least two video segments, and a disagreement between the generated point-clouds for each video segment may be minimized.

The RANSAC algorithm may be characterized by generation of a surface that minimizes the least squares difference from the surface to a point-cloud while satisfying various assumptions, such as an expectation of planarity and linear features and assumptions that recognized symmetry may be likely to continue into undetected areas. The RANSAC algorithm may employ marker-less tracking of an object captured in the scene to observe motion of generated point-clouds and relative changes within the generated point-clouds to infer a 3D movement of the video capturing device that captures the video segment.

In a system according to embodiments, after determination of the relative locations of each video capturing device for the video segments during the timing and overlapping visual frames, at an indexing module 308, audio data for each of the video segments may be indexed with an absolute time reference and location as a function of the overlapping timing. A time-basing approach may be employed to establish the absolute time reference as a sub-frame time reference at less than a frame of the recorded video segment based on a sub-frame synchronization of the video segments. In an example scenario, a video segment may be recorded at 24 frames per second or 0.041666 seconds per frame. The time-basing may establish the sub-frame time reference to an accuracy of less than 0.041666 seconds in the case of a video segment recorded at 24 frames per second.

An example RANSAC time-basing technique to establish the sub-frame time reference may be used to track generated point-clouds for each video segment as the point-clouds change between frames of each of the video segments, and to interpolate the changing point-clouds with a spline. Based on the interpolation, a time lag between the two video segments may be identified that reduces a disagreement between the at least two video segments. In an example embodiment, the RANSAC time-basing may establish the sub-time frame synchronization based on detection of a moving object captured by each of the video segments, and generation of a point-cloud for each of the at least two video segments based on matching the detected movement of the moving object. Another matching approach may include detection of a movement of a spotlight, person or other feature within each video segment. The movement may be interpolated across frames and the video segments may be aligned to a sub-frame accuracy based on matching the interpolated movement. Employing the RANSAC time-basing technique, the accurate sub-frame time reference may be indexed for the audio data of the video segments. Then, audio source extraction and localization may be performed based on the sub-frame time reference and known relative locations of the video capturing devise associated with the video segments.

In a system according to embodiments, after the audio data for each of the audio segments has been synchronized and indexed to the sub-frame time reference, a localization module 310 may extract and localize audio sources for the recorded audio data based on the known relative locations between the at least two video capturing devices and the sub-frame time reference. The localization module 310 may conduct spatial audio source separation of the audio data employing spatial audio processing techniques to identify and localize each audio source within the scene. Additionally, the localization module 310 may consult a library of beam-patterns and sonic characterizations of video recording devices to improve accuracy in the extraction and localization of the audio sources from the audio data. Furthermore, audio spectrograms may be generated before processing and after processing to determine the location and quality of audio sources. For example, a spectrogram may be generated for audio data captured from a first capturing device and a second spectrogram may be generated for audio data captured from a second capturing device. The spectrograms may be processed together, and a new spectrogram for the processed audio data may demonstrate more localized audio data. The more localized audio data maybe visualized in the spectrogram as areas having less graphical noise.

In a further embodiment, audio data for each localized audio source may be transcribed into textual data at a transcription module 312. The transcribed textual data may be added to metadata associated with the video recordings, and a user may search for an audio source based on keywords identified in the transcribed textual data. The transcribed textual data may also generate conversations with improved attribution of speech and may provide accurate word recognition for enhancing content based searches of the audio data.

In an additional embodiment, audio data for each localized audio source may be separated into one or more separate audio channels at a channel separation module 314. The separate audio channels for each localized audio source may then be added back to the video recordings. Each separate audio channel may be accessed separately to enable listening to one audio source at a time.

In some embodiments, a capturing device may be a 360 degree camera configured to be able to capture many different perspectives and views of a scene. In some scenarios, two or more people may carry their capturing devices, including a 360 degree camera, at an event or scene, such that there may be a wide array of capturing devices capturing a scene or event concurrently. When multiple capturing devices such as 360 degree cameras are relatively near each other at a scene or event, sub-frame synchronization and relative location determination as described above between the multiple capturing devices may allow thorough spatial extraction of multiple different speakers and sound sources in the scene.

Figure 4:
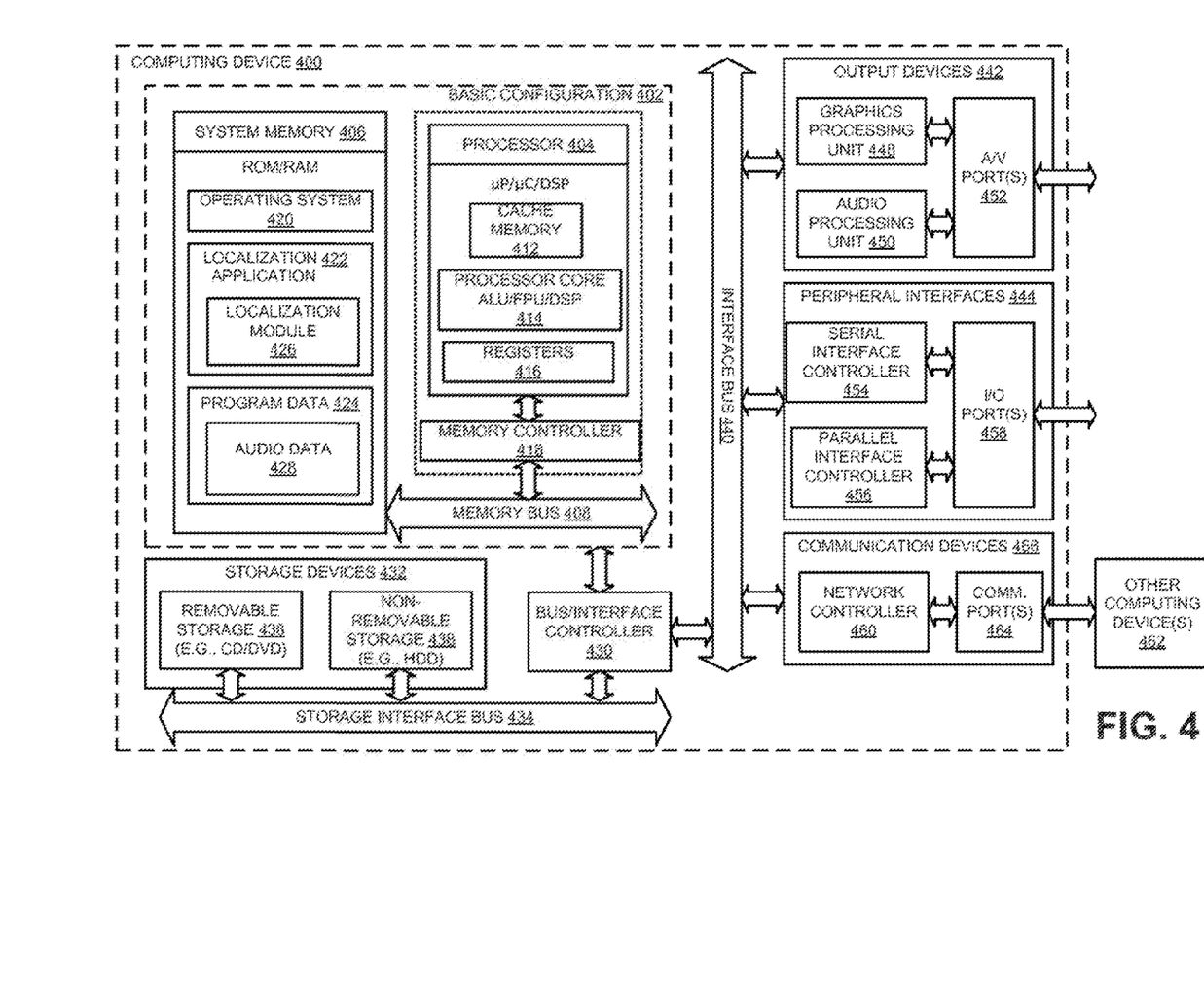
FIG. 4 illustrates a general purpose computing device, which may be used to extract localized audio sources from video recordings.

FIG. 4 illustrates a general purpose computing device, which may be used to extract localized audio sources from video recordings, arranged in accordance with at least some embodiments as described herein.

For example, the computing device 400 may be used as a server, desktop computer, portable computer, smart phone, special purpose computer, or similar device. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor ($\mu$P), a microcontroller ($\mu$C), a digital signal processor (DSP), or any combination thereof. The processor 404 may include one more levels of caching, such as a cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications, such as an audio localization application 422, and program data 424. The audio localization application 422 may include a localization module 426, which may be an integral part of the audio localization application 422 or a separate application on its own.

The localization module 426 may facilitate identifying video segments having overlapping timing and visual frames, and indexing audio data for the video segments with a sub-frame time reference and location as a function of the overlapping timing. The localization module 426 may also facilitate extraction and localization of one or more audio sources for recorded audio data based on a relative location between the least two video capturing devices associated with the video segments and the sub-frame time reference for the video segments. The program data 424 may include, among other data, audio data 428 captured by two video computing devices, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, primer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, client devices, smart appliances, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include bath storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods to extract localized audio sources. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
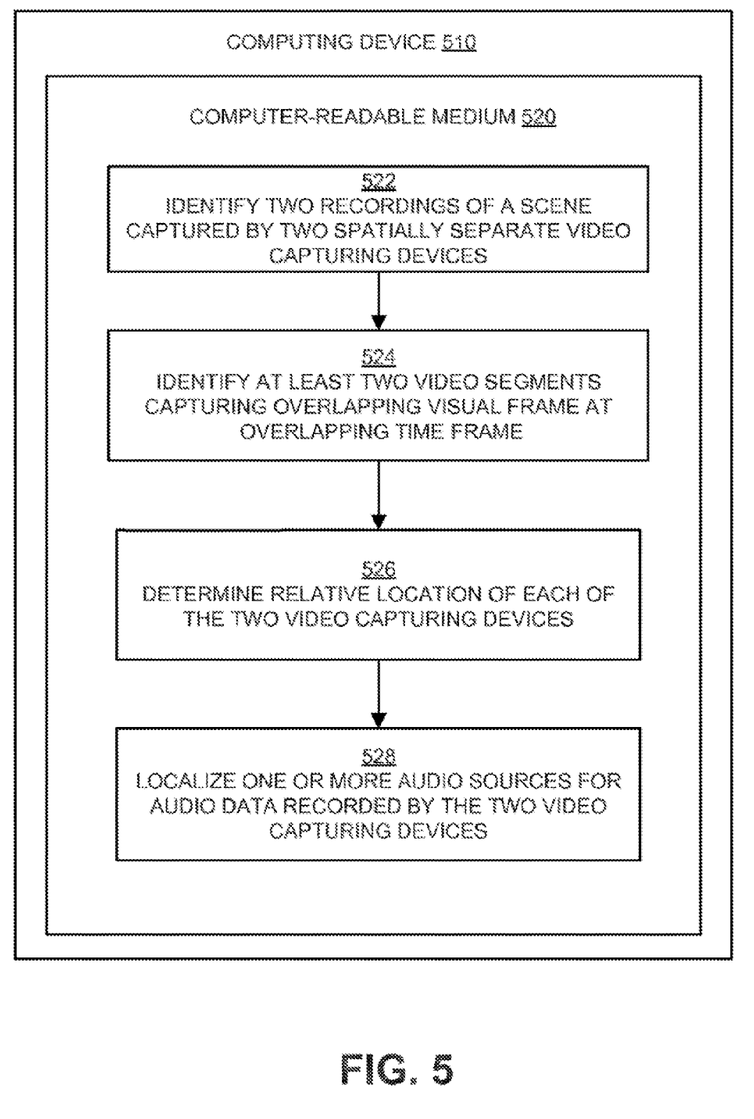
FIG. 5 is a flow diagram illustrating an example method that may be performed by a computing device such as the computing device in FIG. 4.

FIG. 5 is a flow diagram illustrating an example method that may be performed by a computing device such as the computing device in FIG. 4, arranged in accordance with at least some embodiments as described herein.

Example methods may include one or more operations, functions or actions as illustrated by one or more of blocks 522, 524, 526, and 528. The operations described in the blocks 522 through 528 may also be stored as computer-executable instructions in a computer-readable medium such as a computer-readable medium 520 of a computing device 510.

An example process to extract more than one localized audio source may begin with block 522, "IDENTIFY TWO RECORDINGS OF A SCENE CAPTURED BY TWO SPATIALLY SEPARATE VIDEO CAPTURING DEVICES," where at least two video recordings of a scene may be identified, each of the video recordings being captured by spatially separate video capturing devices, such as a smart phone and video camera.

Block 522 may be followed by block 524, "IDENTIFY AT LEAST TWO VIDEO SEGMENTS CAPTURING OVERLAPPING VISUAL FRAME AT OVERLAPPING TIME FRAME," where at least two video segments from two spatially separate video capturing devices are identified by a central server processing the captured video recordings, with each of the video segments capturing an overlapping visual frame at an overlapping timing. Capturing an overlapping visual frame at an overlapping timing may provide at least two perspectives of the scene at a specified time, while also capturing overlapping audio data.

Block 524 may be followed by block 526, "DETERMINE RELATIVE LOCATION OF EACH OF THE TWO VIDEO CAPTURING DEVICES," where a relative position of each of the two video capturing devices may be determined by the central server based on the overlapping visual frames from each of the identified video segments. The relative position may be determined employing a RANSAC algorithm to generate a point-cloud for each video segment and minimize a disagreement between the generated point-clouds.

Block 526 may be followed by block 528, "LOCALIZE ONE OR MORE AUDIO SOURCES FOR AUDIO DATA RECORDED BY THE TWO VIDEO CAPTURING DEVICES," where audio data recorded by the two video capturing devices may be captured, and the audio data from each video segment may be synchronized to a sub-frame time reference at the central server. Based on the sub-frame time reference and the determined relative location of each of the video capturing devices associated with the video segments, one or more audio sources for the audio data in the captured scene may be localized, such that a position of each audio source in the scene may be determined.

The blocks included in the above described process are for illustration purposes. Localization of one or more audio sources for audio data of a scene captured by two or more video capturing devices may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 6:
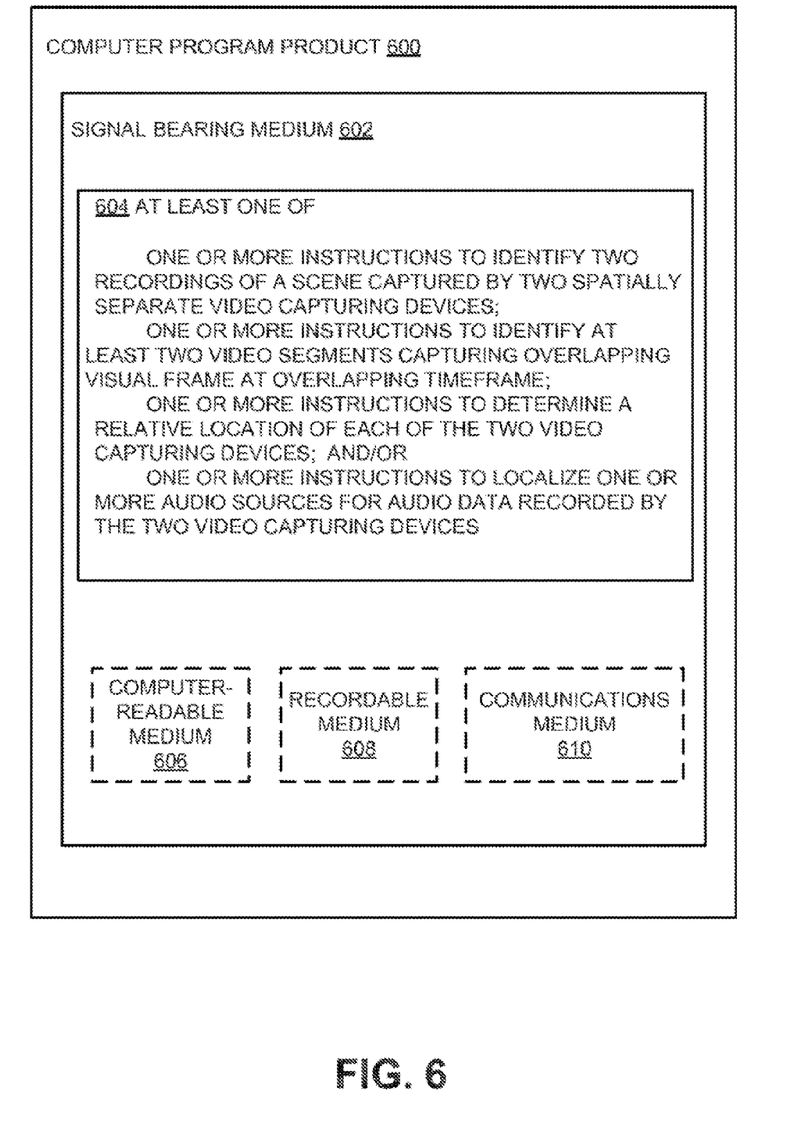
FIG. 6 illustrates a block diagram of an example computer program product, all arranged in accordance with at least some embodiments described herein.

FIG. 6 illustrates a block diagram of an example computer program product, arranged in accordance with at least some embodiments as described herein.

In some embodiments, as shown in FIG. 6, the computer program product 600 may include a signal bearing medium 602 that may also include one or more machine readable instructions 604 that, when executed by, for example, a processor may provide the functionality described above with respect to FIG. 4 and FIG. 5. Thus, for example, referring to the processor 404 in FIG. 4, the localization module 426 executed on the processor 404 may undertake one or more of the tasks shown in FIG. 6 in response to the instructions 604 conveyed to the processor 404 by the signal bearing medium 602 to perform actions associated with localization of one or more audio sources for audio data recorded associated with two video capturing devices as described herein. Some of those instructions may include, for example, one or more instructions for identifying two recordings of a scene by two spatially separate video capturing devices, one or more instructions for identifying at least two video segments capturing overlapping visual frame at overlapping time frame, one or more instructions for determining a relative location of each of the two video capturing devices, and one or more instructions for localizing one or more audio sources for audio data recorded by the two video capturing devices, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc.). Thus, for example, the computer program product 600 may be conveyed to one or more modules of the processor 404 of FIG. 4 by an RF signal bearing medium, where the signal bearing medium 602 may be conveyed by the wireless communications medium 610 (for example, a wireless communications medium conforming with the IEEE 802.11 standard).

According to some examples, the present disclosure describes a method to extract localized audio sources. The method may include identifying two video recordings of a scene captured by two spatially separate video capturing devices, identifying at least two video segments within the recordings capturing an overlapping visual frame of the scene recorded at an overlapping time frame, determining a location of each of the two video capturing devices during the overlapping time frame, and localizing one or more audio sources for audio data recorded by the two video capture devices based on the determined locations of the video capturing devices.

According to some examples, the method may also include indexing recorded audio data with a time reference and a location based on the determined locations of the video capturing devices. The method may also include identifying a third video recording of the scene by a third video capturing device, and identifying a third video segment that captures the overlapping visual frame during the overlapping time frame. The method may also include extracting the audio data for the localized audio sources.

According to some examples, the method may also include separating the audio data for the localized audio sources into one or more separate audio channels. The method may also include adding the separate audio channels for the extracted audio data for the localized audio sources to the video recordings. The method may also include enabling each audio channel to be listened to separately. The method may also include transcribing the audio data for the localized audio sources into textual data. The method may also include adding the transcribed textual data to metadata associated with the video recordings.

According to other examples, the method may also include enabling a search for an audio source based on keywords identified in the transcribed textual data. Identifying the at least two video segments within the recordings may comprises assembling a three-dimensional model of the scene based on two or more recorded video segments of the scene, identifying two or more video frames that capture a same portion of the scene at the overlapping time frame, and selecting the at least two video segments among the identified video frames.

According to other examples, the method may also include employing a point-cloud processing algorithm to determine a relative location of the video capturing devices in reference to each other. The point-cloud processing algorithm may be a random sample consensus (RANSAC) algorithm. Employing the point-cloud processing algorithm to determine the locations of the video capturing devices may comprise generating a point-cloud for each of the at least two video segments, and minimizing a disagreement between the generated point-clouds.

According to further examples, the method may also include indexing the recorded audio data with a time reference by establishing a sub-time frame synchronization between the video segments. Establishing the sub-time frame synchronization between the video segments may include tracking the generated point-clouds as the point-clouds change between frames of the at least two video segments, interpolating the generated point-clouds with a spline, and identifying a time lag between the at least two video segments that minimizes a disagreement between the at least two video segments.

According to some examples establishing the sub-time frame synchronization between the video segments further may include detecting a movement of an object captured by each of the at least two video segments, and generating a point-cloud for each of the at least two video segments based on matching the detected movement of the object. The video capturing devices may include one or more of: a mobile device, a smart phone, a video camera, or computing device configured to simultaneously record video and audio data. The two video recordings may be provided by a database associated with a video gathering application.

According to further examples, the method may also include employing localization information for the audio sources to detect a location of a person in the scene. The method may also include employing localization information for the audio sources to augment an augmented reality presentation. The method may further include employing localization information for the audio sources to generate a three dimensional model of the scene. The method may also include employing localization information for the audio sources to identify a speaker in a meeting.

According to some examples, the present disclosure also describes a server to extract localized audio sources. The server may include a memory configured to store instructions, and a processor configured to execute an audio localization application in conjunction with the instructions stored in the memory. The audio localization application may be configured to identify two video recordings of a scene captured by two spatially separate video capturing devices, identify at least two video segments within the recordings capturing an overlapping visual flame of the scene recorded at an overlapping time frame, determine a relative location of each of the two video capturing devices during the overlapping time frame, and localize one or more audio sources for audio data recorded by the two video capture devices based on the determined locations of the video capturing devices.

According to some examples, the audio localization application may be further configured to index recorded audio data with a time reference and a location based on the determined location of the video capturing devices. The audio localization application may also be further configured to identify a third video recording of the scene by a third video capturing device, and identify a third video segment that captures the overlapping visual frame during the overlapping time frame.

According to some examples, the audio localization application may be further configured to extract the audio data for the localized audio sources. The audio localization application may also be configured to separate the audio data for the localized audio sources into one or more separate audio channels. The audio localization application may also be further configured to add the separate audio channels for the extracted audio data for the localized audio sources to the video recordings.

According to some examples, the audio localization application may be further configured to enable each audio channel to be listened to separately. The audio localization application may also be further configured to transcribe the audio data for the localized audio sources into textual data. The audio localization application may also be further configured to add the transcribed textual data to metadata associated with the video recordings. The audio localization application may also be further configured to enable a search for an audio source based on keywords identified in the transcribed textual data.

In order to identify the at least two video segments within the recordings, the audio localization application may be configured to assemble a three-dimensional model of the scene based on two or more recorded video segments of the scene, identify two or more video frames that capture a same portion of the scene at the overlapping time frame, and select based on the determined locations of the video capturing devices.

According to some examples, the audio localization application may be further configured to employ a point-cloud processing algorithm to determine a relative location of the video capturing devices in reference to each other. The point-cloud processing algorithm may be a random sample consensus (RANSAC) algorithm.

According to some examples, the audio localization application may be further configured to generate a point-cloud for each of the at least two video segments, and minimize a disagreement between the generated point-clouds. The audio localization application may be further configured to establish a sub-time frame synchronization between the video segments to index the recorded audio data with a time reference. In order to establish the sub-time frame synchronization, the audio localization application may be further configured to track the generated point-clouds as the point-clouds change between frames of the at least two video segments, interpolate the generated point-clouds with a spline, and identify a time lag between the at least two video segments that minimizes a disagreement between the at least two video segments.

According to some examples, in order to establish the sub-time frame synchronization, the audio localization application may be further configured to detect a movement of an object captured by each of the at least two video segments, and generate a point-cloud for each of the at least two video segments based on matching the detected movement of the moving object. The video capturing devices include one or more of: a mobile device, a smart phone, a video camera, or computing device configured to simultaneously record video and audio data. The two video recordings may be provided by a database associated with a video gathering application.

According to some examples, the audio localization application may be further configured to employ localization information for the audio sources to detect a location of a person in the scene. The audio localization application may be further configured to employ localization information for the audio sources to augment an augmented reality presentation. The audio localization application may also be configured to employ localization information for the audio sources to generate a three dimensional model of the scene. The audio localization application may also be configured to employ localization information for the audio sources to identify a speaker in a meeting.

According to some examples, the present disclosure also describes a mobile computing device configured to capture data for the extraction of localized audio sources. The mobile computing device may be configured to capture a first video recording of a scene, collect a second video recording of the scene from another mobile computing device, identify at least two video segments with the first and second video recordings that capture an overlapping visual frame of the scene recorded at an overlapping time frame, determine a location of the other mobile computing device relative to the mobile computing device, and localize one or more audio sources for audio data within the first and second video recordings based on the determined locations of the mobile computing device and the other mobile computing device.

According to some examples, the mobile computing device may be configured to extract the audio data for the localized audio sources. The mobile computing device may be further configured to index the audio data with a time reference and a location based on the determined locations of the mobile computing device and the other mobile computing device. The mobile computing device may also be configured to separate the audio data for the localized audio sources into one or more separate audio channels, and add the separate audio channels for the extracted audio data for the localized audio sources to the video recordings.

According to further examples, the mobile computing device may be configured to transcribe the audio data for the localized audio sources into textual data, and add the transcribed textual data to metadata associated with the video recordings. The mobile computing device may include one a video capturing mobile device, a smart phone, a video camera, or a handheld computing device configured to simultaneously record video and audio data.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, hut are not limited to, the following: a recordable type medium such as a floppy disk, a hard disk drive, a Compact Disc (CD), a Digital Versatile Disk (DVD), digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to extract localized audio sources, the method comprising:
   identifying two video recordings of a scene captured by two spatially separate video capturing devices;
   identifying at least two video segments within the recordings capturing an overlapping visual frame of the scene recorded at an overlapping time frame;
   determining a location of each of the two video capturing devices during the overlapping time frame;
   indexing audio data recorded by the two video capture devices with a time reference and a location based on the determined locations of the video capturing devices, wherein a sub-time frame synchronization is established between the at least two video segments to index the audio data with the time reference by:
      generating point-clouds for each of the at least two video segments based on matching a detected movement of an object captured by each of the at least two video segments;
      tracking the generated point-cloud for each of the at least two video segment as the point-clouds change between frames of the at least two video segments;
      interpolating the generated point-clouds with a spline; and
      identifying a time lag between the at least two video segments that minimizes a disagreement between the at least two video segments; and
   localizing one or more audio sources for the audio data recorded by the two video capture devices based on the determined locations of the video capturing devices.

2. The method of claim 1, further comprising:
   identifying a third video recording of the scene by a third video capturing device; and
   identifying a third video segment that captures the overlapping visual frame during the overlapping time frame.

3. The method of claim 1, further comprising:
   employing localization information for the audio sources to one or more of:
      detect a location of a person in the scene;
      augment an augmented reality presentation;
      generate a three dimensional model of the scene; and
      identify a speaker in a meeting.

4. The method of claim 1, further comprising:
   extracting the audio data for the localized audio sources.

5. The method of claim 4, further comprising:
   separating the audio data for the localized audio sources into one or more separate audio channels.

6. The method of claim 1; further comprising:
   transcribing the audio data for the localized audio sources into textual data.

7. The method of claim 6, further comprising:
   adding the transcribed textual data to metadata associated with the video recordings.

8. The method of claim 7, further comprising:
   enabling a search for an audio source based on keywords identified in the transcribed textual data.

9. A server to extract localized audio sources, the server comprising:

a memory configured to store instructions; and a processor configured to execute an audio localization application in conjunction with the instructions stored in the memory, wherein the audio localization application is configured to:
- identify two video recordings of a scene captured by two spatially separate video capturing devices;
- identify at least two video segments within the recordings capturing an overlapping visual frame of the scene recorded at an overlapping time frame;
- determine a relative location of each of the two video capturing devices during the overlapping time frame;
- index audio data recorded by the two video capture devices with a time reference and a location based on the determined location of the video capturing devices, wherein a sub-time frame synchronization is established between the at least two video segments to index the audio data with the time reference by:
  - generating point-clouds for each of the at least two video segments based on matching a detected movement of an object captured by each of the at least two video segments;
  - tracking the generated point-cloud for each of the at least two video segment as the point-clouds change between frames of the at least two video segments;
  - interpolating the generated point-clouds with a spline; and
  - identifying a time lag between the at least two video segments that minimizes a disagreement between the at least two video segments; and
- localize one or more audio sources for the audio data recorded by the two video capture devices based on the determined locations of the video capturing devices.

10. The server of claim 9, wherein, in order to identify at least two video segments within the recordings, the audio localization application is configured to:
- assemble a three-dimensional model of the scene based on two or more recorded video segments of the scene;
- identify two or more video frames that capture a same portion of the scene at the overlapping time frame; and
- select based on the determined locations of the video capturing devices.

11. The server of claim 9, wherein the two video recordings are provided by a database associated with a video gathering application.

12. The server of claim 9, wherein the audio localization application is further configured to:
- employ a point-cloud processing algorithm to determine a relative location of the video capturing devices in reference to each other.

13. The server of claim 12, wherein the point-cloud processing algorithm is a random sample consensus (RANSAC) algorithm.

14. The server of claim 12, wherein the audio localization application is further configured to:
- generate a point-cloud for each of the at least two video segments; and
- minimize a disagreement between the generated point-clouds.

15. A mobile computing device configured to capture data for extraction of localized audio sources, wherein the mobile computing is configured to:
- capture a first video recording of a scene;
- collect a second video recording of the scene from another mobile computing device;
- identify at least two video segments with the first and second video recordings that capture an overlapping visual frame of the scene recorded at an overlapping time frame;
- determine a location of the other mobile computing device relative to the mobile computing device;
- index audio data within the first and second video recordings with a time reference and a location based on the determined locations of the mobile computing device and the other mobile computing device, wherein a sub-time frame synchronization is established between the at least two video segments to index the audio data with the time reference by:
  - generating point-clouds for each of the at least two video segments based on matching a detected movement of an object captured by each of the at least two video segments;
  - tracking the generated point-cloud for each of the at least two video segment as the point-clouds change between frames of the at least two video segments;
  - interpolating the generated point-clouds with a spline; and
  - identifying a time lag between the at least two video segments that minimizes a disagreement between the at least two video segments; and
- localize one or more audio sources for the audio data within the first and second video recordings based on the determined locations of the mobile computing device and the other mobile computing device.

16. The mobile computing device of claim 15, wherein the mobile computing device is further configured to:
- separate the audio data for the localized audio sources into one or more separate audio channels;
- add the separate audio channels for the extracted audio data for the localized audio sources to the video recordings; and
- enable each audio channel to be listened to separately.

17. The mobile computing device of claim 15, wherein the mobile computing device includes a video capturing mobile device, a smart phone, a video camera, or a handheld computing device configured to simultaneously record video and audio data.

* * * * *